United States Patent [19]

Sugio et al.

[11] 4,301,273

[45] Nov. 17, 1981

[54] PROCESS FOR STABILIZING OXYMETHYLENE COPOLYMERS

[75] Inventors: Akitoshi Sugio, Ohmiya; Akira Amemiya, Tokyo; Tadashi Kunii, Yokkaichi; Tomotaka Furusawa; Mutsuhiko Takeda, both of Matsudo; Katsumasa Tanaka, Yokkaichi; Toshikazu Umemura, Tokyo, all of Japan

[73] Assignee: Mitsubishi Gas Chemical Company, Inc., Tokyo, Japan

[21] Appl. No.: 153,674

[22] Filed: May 27, 1980

[30] Foreign Application Priority Data

May 28, 1979 [JP] Japan ................................. 54-65750

[51] Int. Cl.$^3$ ............................................. C08G 2/28
[52] U.S. Cl. ..................................... 528/230; 528/270
[58] Field of Search ............................... 528/230, 270

[56] References Cited

U.S. PATENT DOCUMENTS

| | | | |
|---|---|---|---|
| 3,103,499 | 9/1963 | Dolce et al. | 528/230 |
| 3,253,818 | 5/1966 | Seddon et al. | 528/270 |
| 4,225,703 | 9/1980 | Amann et al. | 528/230 |

FOREIGN PATENT DOCUMENTS 39-8071  5/1964  Japan .

Primary Examiner—Lucille M. Phynes
Attorney, Agent, or Firm—Wenderoth, Lind & Ponack

[57] ABSTRACT

In a process for producing a stabilized oxymethylene copolymer which comprises heat-melting an oxymethylene copolymer having unstable, unblocked terminals obtained by the copolymerization of trioxane with a cyclic acetal and/or a cyclic ether to heat decompose it in the presence of available heat stabilizers; the improvement which comprises heating said oxymethylene copolymer having unblocked terminals in a mixer at a temperature between the melting point of said oxymethylene copolymer and a point 100° C. higher than said melting point under a pressure of 0.1 mmHg to an atmospheric pressure for a mean residence time of 5 to 60 minutes, said mixer comprising a casing, a jacket for heating medium fitted over its external wall, and at least two stirring shafts equipped with a plurality of scraping blades disposed in said casing, said stirring shafts being capable of rotating in the same or different directions, and in the meantime, rotating said stirring shafts of said mixer to heat decompose said oxymethylene copolymer while renewing the surface of the molten oxymethylene copolymer.

5 Claims, 5 Drawing Figures

PROCESS FOR STABILIZING OXYMETHYLENE COPOLYMERS

This invention relates to a process for stabilizing an oxymethylene copolymer under heat. More specifically, this invention relates to a process for producing a stabilized oxymethylene copolymer which comprises heat melting an oxymethylene copolymer having unstable, unblocked oxymethylene terminals to heat decompose it while effectively renewing the surface of the melt.

It is known to produce an oxymethylene copolymer by copolymerizing trioxane with a cyclic ether and/or a cyclic acetal. The crude oxymethylene copolymer itself cannot withstand practical use because it has the group $-(OCH_2)_m OH$ at terminals of its molecular chain and the terminals easily decompose by heating. It has been known to stabilize the crude oxymethylene copolymer by acetylating, etherifying of urethanizing its terminals, or by decomposing it until an oxyalkylene unit derived from the comonomer and having at least 2 carbon atoms contained in the molecular chain forms a terminal of the molecular chain to remove an unstable portion.

The method of stabilization involving decomposition of the terminals is advantageous for stabilizing the crude oxymethylene copolymer. Known stabilization methods of this type include, for example, a method which comprises heat-melting the crude oxymethylene copolymer to decompose and remove an unstable portion (to be referred to as the direct heat-treating method); a method which comprises heat-dissolving the copolymer in a non-aqueous solvent to decompose and remove an unstable portion; a method which comprises heating the copolymer in water or a mixture of water and an alcohol to dissolve it; and a method which comprises heating the copolymer in ammonia or an organic solvent containing ammonia.

Of these, the direct heat-treating method is most advantageous for commercial application because while the other methods use various media and thus require operations of separation, recovery, washing, etc., the direct heat-treating method can afford a stabilized copolymer without such operations.

As such a direct heat-treating method, the use of a roller mill, a Laboplastomill or a vent-equipped Henschel mixer, or formation of a film of the resin on a belt conveyor has been suggested in the past (for example, Japanese patent publication No. 8071/64), but they are merely laboratory-scale techniques.

It is also known to use a ZSK extruder or ZDS extruder marketed by Werner & Pfleiderer Engineers. The ZSK extruder includes elliptical or quasitriangular paddles or screw blocks fixed to a stirring shaft, and the ZDS extruder includes a pair of intermeshing parallel screws. In order to heat decompose an unstable portion of the oxymethylene copolymer and obtain an oxymethylene copolymer having practical stability, by using such an extruder, a residence time of usually 5 to 60 minutes, preferably 20 to 40 minutes, is required.

Accordingly, in such a method using an extruder, a large apparatus is necessary in order to secure such a long residence time, and the cost of production becomes high. Furthermore, in order to increase renewing of the surface of the molten oxymethylene copolymer and perform heat decomposition efficiently, it is necessary to increase the rotating speed of screws of decrease the amount of the oxymethylene copolymer fed. In order to increase the speed of rotation, a far larger apparatus is required. In the case of decreasing the amount of the oxymethylene copolymer fed, the heat of shearing builds up to discolor the oxymethylene copolymer to be stabilized or reduce its heat stability.

Thus, it is very difficult by the conventional direct heating heat-treating method to produce a stabilized oxymethylene copolymer by heat decomposing a molten oxymethylene copolymer having a viscosity of as high as 2000 to 100,000 poises under commercially permissible operating conditions while increasing the renewal of the surface of the molten oxymethylene copolymer.

It is an object of this invention therefore to provide an improved direct heat-treating method for producing a stabilized oxymethylene copolymer having sufficient heat stability for practical applications from an oxymethylene copolymer having unstable, unblocked terminals.

Another object of this invention is to provide a commercially advantageous process for production of a stabilized oxymethylene copolymer by heat-melting an oxymethylene copolymer having unstable, unblocked terminals in a mixer having a great effect of surface renewing.

Other objects and advantages of this invention will become apparent from the following description.

In accordance with this invention, these objects and advantages are achieved by a process for producing a stabilized oxymethylene copolymer by heat decomposing an oxymethylene copolymer having unblocked terminals obtained by the copolymerization of trioxane with a cyclic acetal and/or a cyclic ether, which comprises heating said oxymethylene copolymer having unblocked terminals in a mixer at a temperature between the melting point of said oxymethylene copolymer and a point 100°0 C. higher than said melting point under a pressure of 0.1 mmHg to atmospheric pressure for a mean residence time of 5 to 60 minutes in the molten state, said mixer comprising a casing, a jacket for a heating medium fitted over its external wall, and at least two stirring shafts equipped with a plurality of scraping blades disposed in said casing, said stirring shafts being capable of rotating in the same or different directions, wherein (a) the scraping blades of one stirring shaft and those of another stirring shaft are deviated from each other in the direction of the stirring shafts so as to avoid collision and the tips of the scraping blades of one stirring shaft are capable of rotating while keeping a slight clearance from the inside surface of the casing and the surface of the other stirring shaft, or (b) the scraping blades of one stirring shaft and those of another stirring shaft are located in matched positions in the direction of the stirring shafts and the tips of the scraping blades of one stirring shaft can rotate while keeping a slight clearance from the inside surface of the casing and the stirring blades of the other stirring shaft; and in the meantime, rotating said stirring shafts of said mixer to heat decompose said oxymethylene copolymer while renewing the surface of the molten oxymethylene copolymer.

The process of this invention is described in detail with reference to the accompanying drawings, FIGS. 1 to 5.

FIGS. 1 and 2 are top plan views in section of the mixer used in the process of this invention. In the mixer shown in FIG. 1, the scraping blades of one stirring shaft and those of another shaft are deviated from each other in the direction of the stirring shafts so as to avoid collision, and the tips of the scraping blades of one stirring shaft can rotate while keeping a slight clearance from the inner surface of the casing and the surface of the other stirring shaft. In the mixer shown in FIG. 2, the scraping blades of one stirring shaft and those of another stirring shaft are located in matched positions in the direction of the stirring shafts and the tips of the scraping blades of one stirring shaft can rotate while keeping a slight clearance from the inside surface of the casing and the scraping blades of the other stirring shaft.

Figure 1:
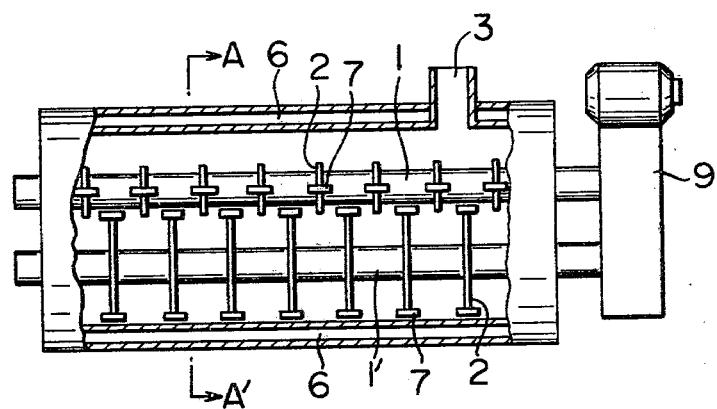
Figure 2:
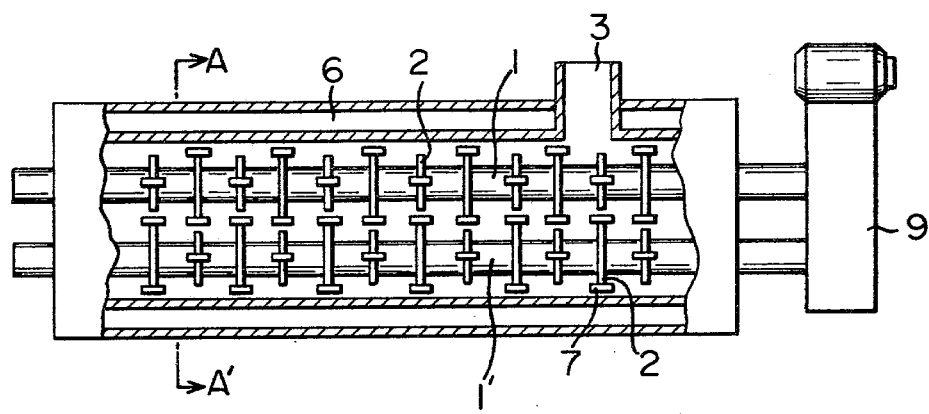

Referring to FIGS. 1 and 2, two stirring shafts 1 and 1' each have a plurality of scraping blades 2. These scraping blades are arranged such that the scraping blades of one stirring shaft do not contact those of the other stirring shafts when the stirring shafts are rotating.

A molten crude oxymethylene copolymer having unblocked terminals is fed into the mixer through a feed opening 3, and is mixed by the blades 2 by the rotation of the stirring shafts 1 and 1' in the same or different direction while it is being heated by a heating jacket 6. The mixture is sent to an discharge opening (not shown) while it undergoes heat decomposition and its surface is renewed. Decomposition gases volatilized by the renewing of the surface are discharged from a gas discharge opening 5.

FIGS. 1 and 2 show two stirring shafts respectively. In FIG. 1, seven to eight scraping blades are attached to one stirring shaft, and in FIG. 2, twelve scraping blades are fixed to one shaft. The mixer used in this invention is not limited to the specific embodiments shown in these drawings, and generally any mixer having at least 2 stirring shafts each of which is equipped with a plurality of scraping blades may be used in this invention.

Figure 3:
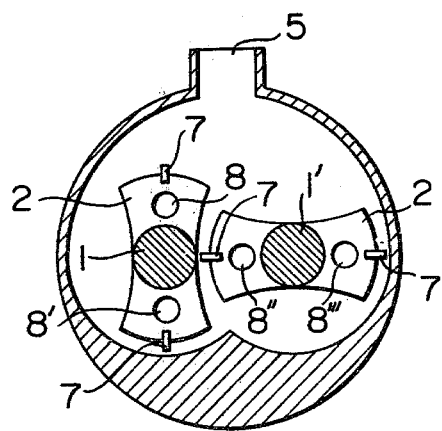
FIGS. 3 and 4 are cross-sectional views taken along the line A—A' of FIG. 1, and line B—B' of FIG. 2, respectively.
Figure 4:
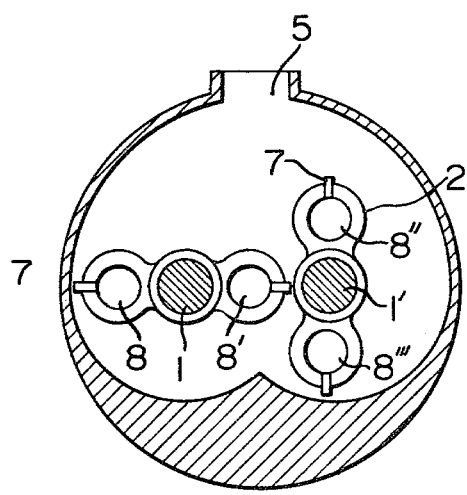

As shown in FIGS. 3 and 4, in the mixer used in this invention, the surface of the bottom of the casing forming an inside space is of a shape conforming to the locus of the scraping blades generated by rotation.

Figure 5A:
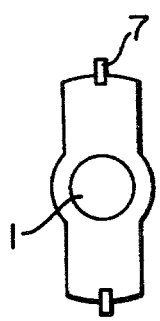
FIGS. 5a, 5b, 5c and 5d show scraping blades provided on the stirring shafts of the mixer.
Figure 5B:
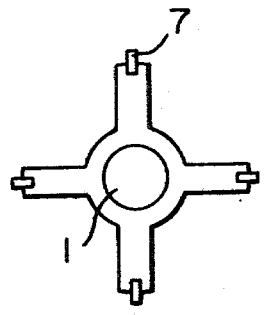
Figure 5C:
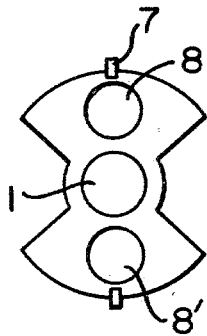
Figure 5D:
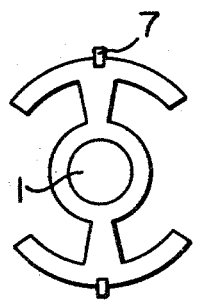

FIGS. 3 and 4 further show the configurations of the scraping blades, and FIGS. 5a to 5d show various other configurations of scraping blades. As shown in these drawings, the scraping blades are preferably equipped with auxiliary blades 7, and are also preferably equipped with escape holes 8, 8', 8'' or 8''' for molten polymer as shown in FIGS. 3, 4 and 5c. The auxiliary blades and the escape holes for molten polymer can be provided in the scraping blades of one stirring shaft, and also in the scraping blades of the other stirring shafts. Or it is possible to fix scraping blades having auxiliary blades and/or polymer escape holes and scraping blades not including them to one stirring shaft. By using a mixer which includes scraping blades equipped with auxiliary blades and/or escape holes for molten polymer, the surface of the molten highly viscous oxymethylene copolymer can be more efficiently renewed, and the unstable portion of the oxymethylene copolymer can be heat-decomposed more favorably.

Preferably, the heat decomposition reaction is carried out while the molten oxymethylene copolymer is filled into about half of the available internal space of the mixer. The space formed on the molten oxymethylene copolymer in the mixer is desirable for effective renewing of the surface of the molten oxymethylene copolymer. The amount of the molten oxymethylene copolymer to be filled in a continuous operation is regulated by a balance between the flow rate of a material feed screw extruder connected to the mixer and that of a screw extruder for withdrawing at the discharge opening of the mixer. The amount of the polymer filled can be easily observed by providing an inspection window at the upper portion of the mixer.

It has been found that the process of this invention can be performed especially advantageously by heat-decomposing the molten oxymethylene copolymer while renewing the surface of the molten oxymethylene copolymer such that the surface renewing coefficient (J) defined by the following equation $$J = N \cdot As/H \tag{1}$$

wherein

N is the average rotating speed (rpm) of a stirring shaft, As is the surface area ($cm^2$) of the molten oxymethylene copolymer, and H is the volume ($cm^3$) of the molten oxymethylene copolymer, is in the range of from 1 to 50 $cm^2/cm^3 \cdot min$.

When J is less than 1 $cm^2/cm^3 \cdot min.$, a practical heat-stabilized oxymethylene copolymer is difficult to obtain even if a suitable treating temperature and a suitable residence time are given. Moreover, with operations which lead to such a J value, troubles, such as the foaming of the resin near the feed opening of the mixer and the clogging of the vent, tend to occur.

The following empirical equation (1)' can approximate the above surface renewing coefficient (J).

$$J = (n\pi R^2 N/4kH) \tag{1'}$$

wherein

N and H are as defined with respect to equation (1), n is the number of scraping blades, R is the diameter (cm) of a circle drawn by the tip of each scraping blade at the time of rotation, k is a constant determined by the depth of the molten oxymethylene copolymer, and $\pi$ is the ratio of the circumference of the circle to its diameter.

In equation (1)', k approaches 1 as the depth of the molten oxymethylene copolymer becomes larger, and approaches 3 as it becomes smaller. When the depth of the molten oxymethylene copolymer is one half of the height of the available inside space, k is 2.

Thus, the surface renewing coefficient J, as is seen from equation (1), is a physical amount defined by the surface area which is formed by a unit volume of molten oxymethylene copolymer per unit time, and from equation (1)', it is seen that this coefficient J is determined by the rotating speed of the stirring shaft, the size of the scraping blades, the number of the scraping blades, and the amount of the molten oxymethylene copolymer filled.

It is most desirable to use a mixer including 20 to 40 scraping blades per stirring shaft, fill a molten oxymethylene copolymer so that it occupies $\frac{1}{4}$ to $\frac{3}{4}$ of the available inside space of the mixer, and rotate the stirring shaft at a speed of 10 to 50 rpm, thereby adjusting the surface renewing coefficient J to 1 to 50 $cm^2/cm^2 \cdot min$.

The heat decomposition reaction is carried out at a temperature between the melting point of the oxymethylene copolymer having unblocked terminals and a point 100° C. higher than the melting point.

At a temperature below the melting point of the copolymer, decomposition of the unstable portion is insufficient. If the temperature exceeds a point 100° C. above the melting point of the copolymer, the main chain of the copolymer is cleaved, and the resulting copolymer has poor heat stability.

The melting point of the oxymethylene copolymer can be determined by measuring its crystal melting initiation temperature by a differential scanning calorimeter (DSC). In the process of this invention, the oxymethylene copolymer having unblocked terminals preferably has a melting point in the range of 140° C. to 175° C. Accordingly, when the copolymer used has a melting point of 140° C., the process of this invention is carried out at a temperature in the range of 140° to 240° C. In the case of an oxymethylene copolymer having a melting point of 175° C., the process is carried out at a temperature in the range of 175° C. to 275° C. Preferably, the process of this invention is carried out at a temperature between a point 20° C. higher than the melting point of the copolymer and a point 80° C. higher than the melting point.

The residence time of the molten oxymethylene copolymer in the mixer is 5 to 60 minutes, preferably 10 to 40 minutes, on an average. Generally, the residence time is shorter as the treating temperature is higher, and the treating temperature is low, the residence time must be prolonged.

The mean residence time can be measured by a response test using a tracer. This can be performed by a procedure comprising feeding a small amount of a tracer non-detrimental to the reaction, such as carbon black, through the material feed opening of the mixer, sampling the resulting copolymer from the discharge opening every predetermined period of time, and the concentration of carbon black tracer in the copolymer is measured by a color difference meter. The time which elapses until the tracer is first incorporated in the resulting copolymer discharged is the shortest residence time $t_s$, and the time which elapses until the concentration of the tracer of the copolymer again becomes zero is the longest residence time $t_l$. The mean residence time $t_m$ is given by $(t_s + t_l)/2$.

The heat decomposition in accordance with this invention is carried out preferably such that the ratio $\tau$ of the longest residence time $t_l$ to the mean residence time $t_m$ is from 1 to 3. When $\tau$ exceeds 3 (for example, when there is a dead space in the reactor), the residence time is extraordinarily long at some locality and consequently the main chain of the copolymer is cleaved to result in a broadened molecular weight distribution and reduced heat stability.

The heat decomposition in accordance with this invention is carried out under a pressure of 0.1 mmHg to atmospheric pressure, preferably 0.1 to 100 mmHg.

The oxymethylene copolymer to be heat-decomposed by the process of this invention is an oxymethylene copolymer having unblocked terminals which is obtained by copolymerizing trioxane with a cyclic acetal and/or a cyclic ether.

The copolymer is produced by ring-opening polymerization of these monomers in a manner known per se.

The cyclic acetal or cyclic ether as a comonomer is expressed by the following formula

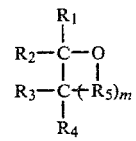

wherein $R_1$, $R_2$, $R_3$ and $R_4$ are identical or different and each represents a hydrogen atom, an alkyl group or a haloalkyl group, $R_5$ represents a methylene or oxymethylene group, an alkyl- or haloalkyl-substituted methylene or oxymethylene group in which case m is zero or an integer of 1 to 3, or a group of the formula $-(-CH_2-)_l OCH_2-$ or $-(-O-CH_2-CH_2-)_l O-CH_2-$ in which case m is 1 and l is an integer of 1 to 4.

The alkyl group in the above definition has 1 to 5 carbon atoms, and may be substituted by 1 to 3 halogen atoms, especially chlorine atoms.

Especially preferred oxymethylene copolymers for use in the process of this invention are those obtained by copolymerizing trioxane with at least one comonomer selected from the group consisting of ethylene oxide, glycol formal, diglycol formal, propylene oxide, epichlorohydrin, butanediol formal, hexanediol formal and 1,3-dioxepane, particularly ethylene oxide and 1,3-dioxepane.

Advantageously, there are used oxyalkylene copolymers having 0.4 to 40 mole%, especially 0.4 to 10 mole%, based on the entire recurring units, of oxyalkylene units derived from these comonomers in the main chain.

From another standpoint, the process of this invention is desirably applied to oxyalkylene copolymers having a base stability ($S_{160}^{120}$), as defined hereinbelow, of at least 85% or a decomposition ratio ($D_{220}^{60}$) at 220° C. in vacuum, as defined hereinbelow, of not more than 15%.

The base stability is determined as follows: The oxymethylene copolymer is dissolved at 160° C. for 120 minutes in benzyl alcohol containing 1% by volume of butylamine, and the solution is cooled. The precipitated copolymer is washed with acetone and dried. The weight of the dried copolymer is divided by the weight to the oxymethylene copolymer before dissolving to obtain the ratio (%) of recovery which is defined as the base stability.

The decomposition ratio at 220° C. in vacuum is determined as follows: The oxymethylene copolymer is heated for 60 minutes in a vacuum of 2 to 3 mmHg. The weight of the heated copolymer is subtracted from the weight of the copolymer before heating. The difference is divided by the weight of the copolymer before heating to obtain the decomposition ratio (%).

These values are nearly identical to the percent weight loss of the oxymethylene copolymer which results from heat decomposition in accordance with the method of this invention. Accordingly, these values are considered to represent the proportion of the unstable portion of the oxymethylene copolymer which is removed by the heat decomposition in accordance with the process of this invention.

With oxymethylene copolymers not having the above-indicated values of base stability or decomposition ratio at 220° C. under vacuum, a mean residence time of more than 60 minutes is generally required. This may lead to a reduction in molecular weight owing to cleavage of the main chain and in the difficulty of obtaining a copolymer having good heat stability.

Investigations of the present inventors have shown that such oxymethylene copolymers preferably used in the process of this invention can be obtained by copolymerizing at least 60 mole% of trioxane and a comonomer of the type exemplified hereinabove in the presence of a polymerization catalyst at a temperature of 0° to 130° C., preferably 10° to 80° C. for 5 to 6 minutes by bulk-polymerization or the like while vigorously mixing the monomers with stirring. Copolymerization of a starting mixture substantially free from a solvent and consisting of trioxane and 2 to 10 mole% of ethylene oxide or 1,3-dioxepane gives especially suitable crude oxymethylene copolymers having an $S_{160}^{120}$ of at least 85% or a $D_{220}^{60}$ of not more than 15%. A known cationic polymerization catalyst is used as the polymerization catalyst. In particular, at least one of boron trifluoride, boron trifluoride hydrate and coordination compounds of oxygen- or sulfur-containing organic compounds (e.g., diethyl ether) with boron trifluoride, either in gaseous form or as a solution in a suitable organic solvent, is preferred as the catalyst. The polymerization catalyst remains in the crude oxymethylene copolymer obtained after the polymerization reaction.

The process of this invention is favorably applied to oxymethylene copolymers having unblocked terminals which are substantially free from the polymerization catalyst, or contain the polymerization catalyst in the deactivated state.

Some of the coinventors of the present invention previously proposed a process for obtaining a stabilized oxymethylene copolymer without removing the catalyst from the polymerization product by deactivating the catalyst with a tertiary phosphine compound (U.S. Pat. No. 4,087,411). The process of this invention can be applied especially aevantageously to crude oxymethylene copolymers containing the polymerization catalyst in the deactivated state which are obtained by this process. Needless to say, the catalyst may be removed from the oxymethylene copolymer obtained by the polymerization reaction by washing, etc., before submitting it to stabilization by the process of this invention.

In performing the process of this invention, the oxymethylene copolymer having unblocked terminals is heat-melted in the presence of available a heat stabilizers.

The heat stabilizers may be included in the oxymethylene copolymer to be fed into the mixer, or may be added to the mixer separately.

The heat stabilizers serve to prevent effectively cleavage of the main chain of the oxymethylene copolymer by heat melting, but do not substantially hamper the heat-decomposition of the unstable portion under the heat melting conditions in the process of this invention.

Heat stabilizers for preventing cleavage of the main chain of oxymethylene copolymers are known, and for example, hindered phenol compounds can be used. The mixed heat stabilizers containing hindered phenol compounds disclosed in Japanese patent application Laid-Open patent publication No. 78256/78 and U.S. patent application Ser. No. 132,165, filed on Mar. 20, 1980 are favorably used in this invention.

The following examples illustrate the present invention more specifically. The intrinsic viscosities of polymers, unless otherwise specified, mean those measured in p-chlorophenol containing 2% by weight of α-pinene at 60° C. (dl/g).

EXAMPLE 1

(1) Production of a crude oxymethylene copolymer by continuous polymerization

A continuous polymerization apparatus was used which consisted of a first-stage polymerization reactor including a long casing, a jacket fitted over its external wall and a pair of shafts disposed in the casing, each shaft having fitted therein a number of intermeshing elliptical plates with the end portions of the long axes of the elliptical plates capable of cleaning the inside wall surface of the casing and the surfaces of the other elliptical plates; and a second-stage polymerization reactor connected directly to the first-stage polymerization reactor. The second-stage polymerization reactor was a horizontal stirring device including a long casing, a jacket fitted over its external wall and a pair of shafts disposed in the casing, each shaft having stirring blades suitable for powder mixing but without self-cleaning ability. The casing of the first-stage reactor had an inside diameter of 50 mm, and the casing of the second-stage reactor had an inside diameter of 140 mm. A similar type of horizontal stirring device, serving as a polymerization stopper mixer, was directly connected to the second-stage reactor so that a deactivating agent for the polymerization catalyst could be injected into the mixer and mixed continuously with the crude polymer powder.

The first-stage polymerization reactor was charged hourly with 2 kg of trioxane, 50 g of ethylene oxide and 0.18 millimole, per mole of trioxane, of boron trifluoride diethyl etherate, and while the polymerization temperature was maintained at 80° C., trioxane and ethylene oxide were copolymerized. The mean residence time in the first-stage polymerization reactor was about 6 minutes, and a copolymer powder containing 40% of the unreacted monomers was sent to the second-stage polymerization reactor. In the second-stage reactor, the reaction temperature was maintained at 50° C., and the reaction mixture was slowly stirred and transported toward the discharge opening until the polymerization was completed. The mean residence time in the second-stage polymerization reactor was about 40 minutes, and the resulting crude copolymer contained less than 2% by weight of the unreacted trioxane. The crude copolymer powder was immediately sent to the polymerization stopper mixer, and 2 moles, per mole of the catalyst used, of triphenyl phosphine was added as a benzene solution, and mixed with the copolymer. The above process was operated continuously for about 300 hours, and a crude copolymer having an intrinsic viscosity of 1.43 to 1.45 dl/g was obtained in a yield of 96.5 to 97.5%.

The crude copolymer was dried in vacuum at 60° C. for 10 hours to remove the unreacted monomers and a trace of the solvent. 2.5 G of the dried copolymer was added to 25 ml of benzyl alcohol containing 1% by volume of butylamine, and the solution was heated at 160° C. in a 100 ml eggplant-shaped flask for 2 hours. The product was cooled, and the precipitated polymer was separated by filtration, well washed with acetone, and dried in vacuum. The $S_{160}^{120}$ (base stability) of the crude oxymethylene copolymer so measured was 93.5%.

Two grams of the same vacuum-dried product as used in measuring $S_{160}{}^{120}$ was put into a test tube. The inside of the test tube was evacuated by a vacuum pump to a pressure of 2 mm to 3 mmHg, and the sample was heated at 220° C., and its decomposition ratio at the end of 1 hour was measured. The product was found to have a $D_{220}{}^{60}$ of 6.8%.

The copolymer had a melting point of 164° C.

(2) Stabilization of the crude oxymethylene copolymer

The crude oxymethylene copolymer obtained in (1) above was heat-stabilized by using a reactor of the type shown in FIG. 2 (in which the tips of the scraping blades of one stirring shafts were located at positions corresponding to the positions of the tips of the scraping blades of the other stirring shaft). The scraping blades used were of the shape shown in FIG. 4 having holes for escape of molten polymer. The casing of the reactor had an inside diameter of 30 cm, and the diameter of a circle drawn by the end of the long axis of each blade was 20 cm. The number of blades fixed to each shaft was 15, and thus the total number of blades in the reactor was 30. The available volume of the reactor was 60 liters. The amount of the material fed into the reactor was adjusted to 20 liters by controlling the rotating speeds of a screw extruder for feeding and a screw extruder for withdrawal fixed respectively to the bottoms of the front and rear portions of the reactor.

In each run, the molten crude oxymethylene copolymer having unblocked terminals was fed at a rate of 48 kg/hr. The apparent density of the resin in the reactor was 1.0. The means residence time of the resin, determined by the tracer response test described hereinabove, was 25 minutes, and the $\tau$ value was 2.5. This value was almost invariable with variations in the rotating speeds of the shafts of the reactor. Heat stabilization of the copolymer was performed at a reaction temperature of 210° C. while varying the surface renewing coefficient J at various shaft rotating speeds. J was determined in accordance with equation (1)' in which k was 1.8.

The intrinsic viscosity, color and decomposition ratio at 222° C. in air of the heat stabilized copolymer were measured. Furthermore, test specimens were prepared by injection molding of the heat stabilized copolymer. The test specimens were subjected to an aging test in a constant-temperature vessel kept at 140° C. in the air, and their tensile impact strengths after a lapse of 500 hours and 1000 hours, respectively, were measured. The results are shown in Table 1.

The stabilizer used in all runs consisted of 0.1% of calcium hydroxide, 0.2% of polyvinyl pyrrolidone and 0.5% of Irganox 259 (a tradename for an antioxidant, sold by Ciba-Geigy).

What we claim is:

1. In a process for producing a stabilized oxymethylene copolymer which comprises heat-melting an oxymethylene copolymer having unstable, unblocked terminals obtained by the copolymerization of trioxane with a cyclic acetal and/or a cyclic ether to heat decompose it in the presence of available heat stabilizers; the improvement which comprises heating said oxymethylene copolymer having an unblocked terminals in a mixer at a temperature between the melting point of said oxymethylene copolymer and a point 100° C. higher than said melting point under a pressure of 0.1 mmHg to atmospheric pressure for a mean residence time of 5 to 60 minutes, said mixer comprising a casing, a jacket for a heating medium fitted over its external wall, and at least two stirring shafts equipped with a plurality of scraping blades disposed in said casing, said stirring shafts being capable of rotating in the same or different directions, wherein (a) the scraping blades of one stirring shaft and those of another stirring shaft are deviated from each other in the direction of the stirring shafts so as to avoid collision and the tips of the scraping blades of one stirring shaft are capable of rotating while keeping a slight clearance from the inside surface of the casing and the surface of the other stirring shaft, or (b) the scraping blades of one stirring shaft and those of another stirring shaft are located in matched positions in the direction of the stirring shafts and the tips of the scraping blades of one stirring shaft can rotate while keeping a slight clearance from the inside surface of the casing and the stirring blades of the other stirring shaft; and in the meantime, rotating said stirring shafts of said mixer to heat decompose said oxymethylene copolymer while renewing the surface of the molten oxymethylene copolymer.

2. A continuous process for producing a stabilized oxymethylene copolymer according to claim 1 wherein the oxymethylene copolymer having unblocked terminals is continuously fed into said mixer, and the stabilized oxymethylene copolymer is continuously withdrawn from the mixer.

3. The process of claim 2 wherein the surface of the molten oxymethylene copolymer is renewed such that the surface renewing coefficient defined by the following equation (1)

$$J = (N \cdot As/H) \tag{1}$$

wherein
N is the average rotating speed (rpm) of the rotating shafts, As is the surface area (cm$^2$) of the molten oxymethylene copolymer, and H is the volume (cm$^3$) of the molten oxymethylene copolymer,
is in the range of 1 to 50 cm$^2$/cm$^3$·min.

4. The process of any one of claims 1 to 3 wherein the molten oxymethylene copolymer is caused to reside in

TABLE 1

| Run No. | Shaft rotating speed (rpm) | J (cm²/cm³ · min.) | Color of pellets | Intrinsic viscosity (dl/g) | Decomposition ratio at 222° C. in air (%) | | Tensile impact strength (kg-cm/cm²) Heat aging time at 140° C. | | |
|---|---|---|---|---|---|---|---|---|---|
| | | | | | 5 hours | 8 hours | 0 hour | 500 hours | 1000 hours |
| 1 | 50 | 13 | White | 1.45 | 6.8 | 15.0 | 104 ± 41 | 76 ± 14 | 30 ± 3 |
| 2 | 70 | 18 | White | 1.45 | 5.7 | 14.8 | 107 ± 35 | 82 ± 58 | 46 ± 15 |
| 3 | 20 | 5 | White | 1.46 | 9.8 | 25.6 | 82 ± 9 | 81 ± 39 | 20 ± 3 |
| 4 | 10 | 3 | White | 1.45 | 12.5 | 30.5 | 85 ± 17 | 62 ± 21 | 15 ± 10 |

Note:
The test specimens for the tensile impact strength test had a thickness of ⅛ inch and were S-shaped. The injection molding was carried out using MEIKI SJ-35B (trademark for an injection molding machine). The ± values after the tensile impact strength values show errors at a reliability limit of 95%.

the mixer so that the ratio of the longest residence time to the mean residence time is from 1 to 3.

5. The process of any one of claims 1 to 4 wherein said oxymethylene copolymer having unblocked terminals has a base stability ($S_{160}^{120}$) of at least 85%, or a decomposition ratio ($D_{220}^{60}$) at 220° C. under vacuum of not more than 15%.

* * * * *